Figure 3:
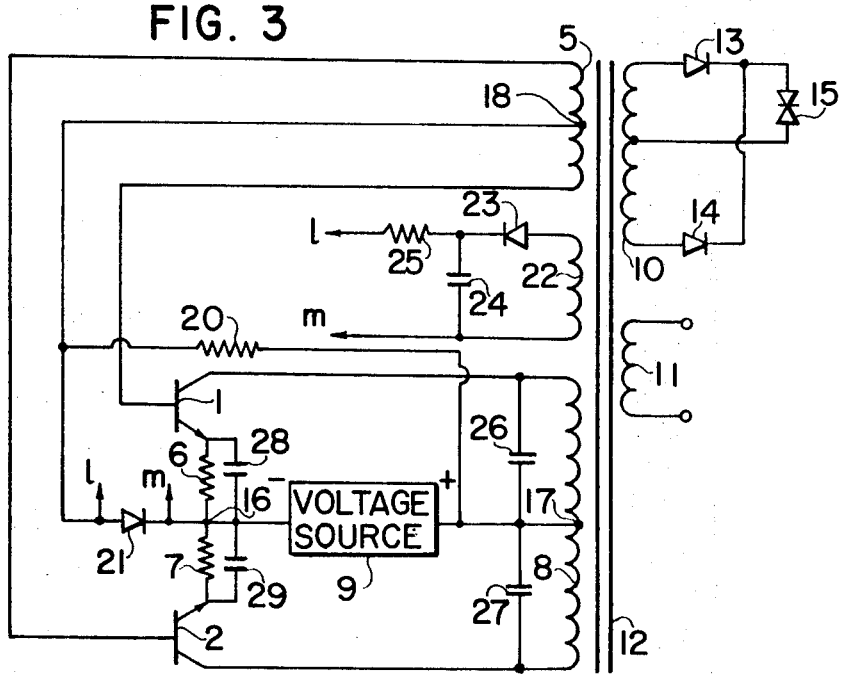

United States Patent

[11] 3,611,205

| [72] | Inventors | Shinichi Ogawa<br>Tokyo;<br>Fumiyuki Inose, Hachioji-shi, both of Japan |
|---|---|---|
| [21] | Appl. No. | 837,838 |
| [22] | Filed | June 30, 1969 |
| [45] | Patented | Oct. 5, 1971 |
| [73] | Assignee | Hitachi, Ltd.<br>Tokyo, Japan |
| [32] | Priority | July 8, 1968 |
| [33] | | Japan |
| [31] | | 43/47109 |

[54] MAGNETIC MULTIVIBRATOR CIRCUIT
9 Claims, 6 Drawing Figs.

[52] U.S. Cl. .................................................... 331/113 A, 321/2
[51] Int. Cl. ...................................................... H03k 3/16
[50] Field of Search ........................................... 331/113 A; 321/2

[56] References Cited
UNITED STATES PATENTS

| 2,997,664 | 8/1961 | Jensen............................ | 331/113 X |
| 3,210,690 | 10/1965 | Mokrytzki et al.............. | 331/113 |
| 3,264,577 | 8/1966 | Lingle............................ | 331/113 X |
| 3,275,948 | 9/1966 | Rosenbusch................... | 331/113 |
| 3,284,724 | 11/1966 | Marlow........................ | 331/113 X |

*Primary Examiner*—Roy Lake
*Assistant Examiner*—James B. Mullins
*Attorney*—Craig, Antonelli, Stewart & Hill ABSTRACT: A magnetic multivibrator circuit having a pair of transistors provided with feedback winding means from the collector electrodes to the base electrodes respectively in order to cause on-off operation thereof, which further comprises a zener diode connected across a winding which is electromagnetically coupled with said feedback-winding means, thereby the multivibrator has a high-input impedance.

3,611,205
SHEET 1 OF 2
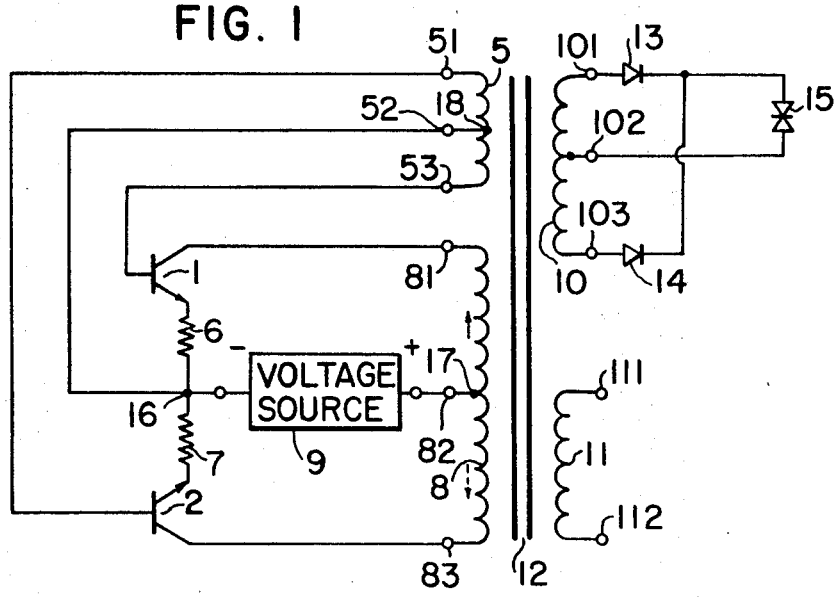
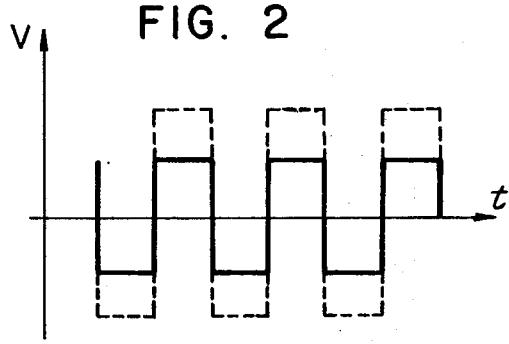
INVENTORS
SHINICHI OGAWA and FUMIYUKI INOSE
BY Craig, Antonelli, Stewart & Hill
ATTORNEYS INVENTORS
SHINICHI OGAWA and FUMIYUKI ENOSE BY Craig, Antonelli, Stewart & Hill
ATTORNEYS

MAGNETIC MULTIVIBRATOR CIRCUIT

This invention relates to an oscillator circuit and particularly to a magnetic multivibrator circuit mainly used as a voltage source in the field of industrial instrumentation.

The magnetic multivibrator, in general, is provided with a pair of transistors each having emitter, base, and collector electrodes, a first winding connected with both base electrodes and a second winding connected with both collector electrodes of the transistors, the windings being magnetically coupled to each other so as to perform a positive feedback from collector to base electrode of each transistor. Thereby, a pair of transistors are caused to perform on-and-off operations alternately and a rectangular wave voltage may be obtained from the output winding which is magnetically coupled together with the first and second windings.

In the field of industrial instrumentation, such multivibrators are widely used as voltage sources such as, for example, an exciting voltage source for a chopper circuit.

Conventional multivibrator circuits, of this type, however, have inherent defects in that the oscillation frequency and the amplitude of the output voltage are caused to vary in accordance with changes in the operating voltage for the multivibrator, and the operating voltage actually applied from a voltage source to the multivibrator depends upon the internal impedance of the voltage source because the input impedance of the multivibrator viewed at the terminals of the voltage source is not very high in comparison to the internal impedance of the voltage source.

In a conventional multivibrator, such as a Royer circuit, the relation between the oscillation frequency $f$ and the operating voltage $V_1$ and between the operating voltage $V_1$ and output voltage $V_2$ of the multivibrator are represented by the following equations;

$$f = K_1 V_1 \quad (1)$$
$$V_2 = K_2 V_1 \quad (2)$$

where: $K_1$, $K_2$ are constants dependent upon the number of turns of the windings and saturation flux on which the windings are wound.

Accordingly, changes $\Delta V_2$ in operating voltage immediately result in variations of the oscillation frequency $\Delta f$ and output voltage $\Delta V_1$. When such a conventional multivibrator is used as the voltage source in industrial instruments, instrumentation errors necessarily occur in accordance with changes in the operating voltage of the multivibrator.

The latter defect of the conventional multivibrator is also undesirable for the reason that in such applications, the operating voltage source is frequently disposed in a central control station which is located more than several miles away from the place at which the multivibrator is disposed. In this case, even if the operating voltage of the voltage source at the central control station is maintained at a constant level, the voltage actually applied to the multivibrator varies in accordance with the impedance of the transmission lines, because the operating voltage is divided in the ratio of the input impedance of the multivibrator to the impedance of the transmission line and the voltage obtained across the input impedance is applied to the multivibrator. Such variations in the input operating voltage of the multivibrator inevitably produce instrumentation errors.

In order to eliminate the above-mentioned defects, it is required that the multivibrator have a considerably high-input impedance in comparison to the equivalent internal impedance of the operating voltage source.

Accordingly, one object of the present invention is to provide a magnetic multivibrator circuit which has a high-input impedance so that the operating voltage actually applied to the multivibrator does not depend on the equivalent internal impedance of the operating voltage source.

Another object of the present invention is to provide a magnetic multivibrator circuit whose oscillation frequency and output voltage may be maintained at a constant level by means of a zener diode.

A further object of the invention is to provide a magnetic multivibrator circuit which is relatively low in cost and can operate accurately and stably.

Figure 5:
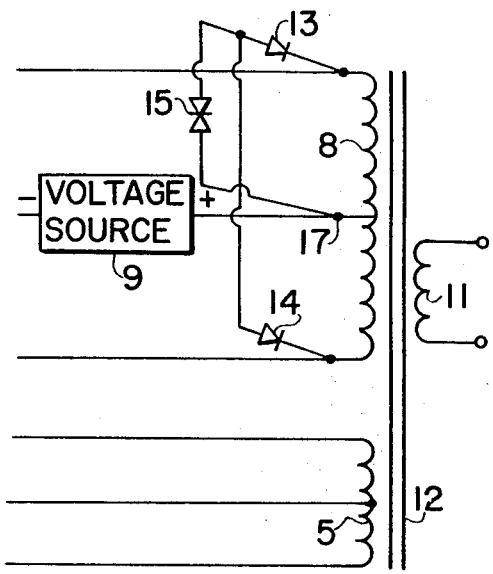

Other objects, features and advantages of the invention will be apparent from the following detailed description when read in conjunction with the accompanying drawings, in which:

FIGS. 1 and 3 are circuit diagrams of respective embodiments of the magnetic multivibrator circuit according to the present invention, FIG. 2 shows an output voltage waveform for an explanation of the operation of the multivibrator circuit, FIGS. 4A and 4B show output waveforms according to the circuit of FIGS. 1 and 3, and FIG. 5 is a partial circuit diagram of a further modification according to the present invention.

Referring now to FIG. 1, there is provided a pair of transistors 1 and 2 of NPN type used as switching elements. Transistors of the other conductivity type may also be used, as is well known. The base electrodes of the transistors 1 and 2 are connected to respective terminals 51 and 53 of a winding 5. Between the emitter electrodes of the transistors 1 and 2, resistors 6 and 7 are connected in series and the resistances thereof are preferably equal to each other.

On the other hand, the collector electrodes of the transistors 1 and 2 are connected to respective terminals 81 and 83 of a winding 8. An operating voltage source 9 for the transistors 1 and 2 is inserted between an intermediate tap 17 of the winding 8 and the junction point 16 of the serially connected resistors 6 and 7. Said point 16 is also connected with an intermediate tap 18 of the winding 5. The windings 5, 8, 10 and 11 are wound on a single core 12 so that all windings are electromagnetically coupled to each other. Due to the electromagnetic coupling between the windings 5 and 8, the collector current of the transistors 1 and 2 is fed back to the base electrodes thereof.

Now, it is assumed that the one transistor 1 is in the on-state and the other transistor 2 is in the off-state. Under this condition, the collector current flows through the resistor 6, an emitter-collector path of the transistor 1 and a portion of winding 8 between the intermediate tap 17 and the terminal 81, the direction of this current being indicated by a solid arrow in FIG. 1. By this collector current, a voltage is induced across the winding 5 which is in a forward direction with respect to the base electrode of the transistor 2 but is in a reverse direction with respect to the base electrode of the transistor 1. Because of this, the base current of the transistor 1 is decreased and that of the transistor 2 is increased, so that presently the states of the transistors will be reversed respectively, that is, the transistor 1 is rendered nonconductive and the transistor 2 is rendered conductive.

When the transistor 2 conducts, the collector current flows through the resistor 7, the emitter-collector path of the transistor 2 and the portion of winding 8 between the intermediate tap 17 and the terminal 83, the direction of this current being indicated by the dotted arrow in FIG. 1. By this collector current a voltage is induced across the winding 5, which adds to that of the voltage generated by the current of the transistor 1. Thus, the transistors 1 and 2 are caused alternately to be in on- and off-states respectively in an opposite sense and a rectangular wave voltage as shown in FIG. 2 by dotted line may be obtained from the output winding 11 wound around the core 12.

One feature of the present invention is that a circuit for maintaining the voltage across the winding 5 and 8 at a constant value is provided which comprises a zener diode 15 and a semiconductor diodes 13 and 14 for rectifying the voltage applied to the zener diode 15 from the winding 10 wound around the core 12.

Another feature is that the resistors 6 and 7 are inserted in the emitter circuits of the transistors so that the on-off functions of the transistors 1 and 2 may be performed in the cutoff region and in the linear operating region of the operating characteristics of the transistors. In other words, transistors 1 and 2 may not be operated in the saturation region even though the transistors are caused to be in the on-state. Therefore, the output rectangular wave voltage of the multivibrator circuit according to the present invention is suppressed to a constant amplitude, as shown by solid line in FIG. 2.

Assuming that the zener voltage of the zener diode 15 is indicated by $V_z$, the induced voltage across the winding portion between the terminals 51 and 52 as well as the winding portion between terminals 52 and 53 of the winding 5 is represented as follows;

$$V_{12}=V_{23}=V_z(Np/Nz)$$

where:

$Np$ : number of turns of the winding portion between the terminals 51 and 52 as well as 52 and 53 of the winding 8.

$Nz$ : number of turns of the winding portion between the terminals 101 and 102 as well as 102 and 103 of the winding 10.

When the induced voltage across the winding 5 is in the forward direction with respect to the base electrode of the transistor 1, the base current $I_{B1}$ of the transistor 2 is represented by the following equation;

$$I_{B1}=V_{23}/R_{in}=V_z(Ns/R_{in}N_z)$$

where: $R_{in}$ is the input resistance of the transistor 1.

According to the present invention, the resistance of the resistor 6 is selected to be a predetermined value in such a manner that an operating point of the transistor 1 is in the linear operating region of the collector current versus collector-emitter voltage characteristic.

The input resistance $R_{in}$ is nearly equal to $\beta R_{E6}$ in which $\beta$ indicates a current amplification factor of the transistor 1, because transistor 1 is constructed in emitter-follower configuration.

Therefore, the following equation is derived.

$$I_{B1}=V_z(Ns/Nz)\times 1/\beta R_{E6}$$

Being based on such base current $I_{B1}$, the current $I_{C1}$ flows through resistor 6, the emitter-collector current path of the transistor 1 and terminals 81 and 82, which is supplied from the operating voltage source 9 and is represented by;

$$I_{C1} \doteq \beta I_{B1} \doteq \frac{V_z \cdot \dfrac{Ns}{Nn}}{R_{E6}}$$

As is obvious from the above-mentioned equation, the current $I_{C1}$ does not depend on the operating voltage $V_q$ of voltage source 9. In other words, even if the operating voltage $V_q$ varies over a wide range, the current $I_{C1}$ will be only slightly varied. Therefore, the input impedance ($\Delta V_q/\Delta I$) of the circuit shown in FIG. 1 at both the terminals of the source 9 is extremely high with respect to the internal impedance of the operating voltage source 9.

It has been proven by experiment that the above-described multivibrator has an input impedance of about $200_k\Omega$ which is sufficient value as an impedance for the exiting voltage source used in the field of industrial instrumentation. Then, the frequency $f$ of the output voltage according to the multivibrator circuit shown in FIG. 1 is represented as follows; $f=Vz/4Nz\Phi m$ where $\Phi m$ indicates the saturation flux of the core 12. As apparent from the above equation, the frequency $f$ is also independent of the operating voltage of the source 9.

By the results of experiment it can be shown that when the operating voltage is varied over a range of about 10 volt at 10 Hertz of the operating oscillation frequency, changes in the output frequency are recognized to be only 1 Hertz. Furthermore, according to this invention, the amplitude of the output voltage $V_o$ is determined by the zener voltage $V_z$ of the zener diode 15 and the number of turns of windings 10 and 11.

That is, $$V_o=V_z(No/Nz)$$

where $N$ indicated the number of turns of the output winding 22. Accordingly, the amplitude of the output voltage is maintained at a constant value in spite of the variations in the amplitude of the operating voltage.

Reference is now made to FIG. 3 which is a circuit diagram of another embodiment of the present invention. In this circuit, a resistor 20 is connected between the positive terminal of the operating voltage source 9 and the intermediate tap 18 of the winding 5.

At the starting time of the multivibrator circuit, the starting current is supplied from the operating voltage source 9 to the base electrode of the transistors 1 and 2 by way of the resistor 20.

On the core 12 another winding 22 is wound. A rectangular wave voltage induced across the winding 22 is rectified by a diode 23 and is smoothed by a smoothing circuit comprising a condenser 24 and a resistor 25. The output DC voltage from the smoothing circuit is applied across a diode 21 which is inserted between the intermediate tap 18 of winding 5 and the connection point 16. By the voltage drop across the diode 21 the base electrodes of the transistors 1 and 2 are biased in the forward direction with respect to the emitter electrodes thereof, respectively. Furthermore, the diode 21 acts for ensuring the start of oscillation and for preventing the reduction of the input impedance for the following reasons. That is, at the starting time of the oscillation, the diode 21 may be maintained in the nonconductive state since the voltage applied across the diode may be lower than the threshold voltage thereof. During such period, the current does not flow through the diode 21 but flows into the base electrodes of the transistors 1 and 2. Accordingly, even if the resistance of the resistor 20 is considerably high so as not to reduce the input impedance at the terminals of the operating voltage source 9, a required starting current may be obtained.

Condensers 26 and 27 are connected between the respective outer terminals of the winding 8 and the intermediate tap 17 so that the multivibrator circuit does not cause an undesired oscillation at high frequency. If the condensers 26 and 27 are not connected in the multivibrator circuit, the operation of the circuit is effected by leadage inductances, the cutoff frequency of the transistors and the like, thereby the multivibrator circuit causes an undesired oscillation at high frequency, and the output voltage shown in FIG. 4A may be obtained therefrom. However, the improved circuit according to this embodiment is completely free from the above-mentioned defect and normal rectangular wave voltage as shown in FIG. 4B can be obtained from the output winding 11. Furthermore, in the multivibrator circuit shown in FIG. 3, the bypath condensers 28 and 29 of small capacities are respectively connected in parallel with the emitter resistor 6 and 7. The emitter resistor is, in general, operated as a negative feedback resistor which serves for preventing sharp rising and falling of the rectangular wave.

According to this embodiment, however, the condensers 28 and 29 may provide a substantial short between the respective emitter electrodes at the oscillation frequency of this circuit, so that the negative feedback based on the resistors 6 and 7 is eliminated and the rising and falling characteristics of the rectangular wave voltage may be improved.

The present invention may be further modified; for example, in the circuit shown in FIGS. 1 and 3, the zener diode may be connected across the winding 5 or the winding 8 substituting for the diode 15 connected across the winding 10. When the voltage across one of the windings wound around a core is fixed at a constant value, the voltage induced across the other windings is determined solely by the ratio of the turns of the windings which is also fixed.

FIG. 5 indicates the circuit according to the above-mentioned modification wherein diodes 13 and 14 are serially connected in an opposite sense across the winding 8 and the zener diode 15 is connected between the intermediate tap 17 of the winding 8 and the connection point of the diodes 13 and 14. The configuration of the remainder of this circuit may be similar to that of either of the aforementioned multivibrator circuits shown in FIGS. 1 and 3. Furthermore, another constant voltage element, such as a battery having a low internal resistance may be substituted for the zener diode.

We claim:

1. A magnetic multivibrator circuit comprising:
   a pair of switching transistors each having base, emitter, and collector electrodes;
   a first winding connected between the base electrodes of said transistors;
   a second winding connected between the collector electrodes of said transistors and magnetically coupled with said first winding; first and second emitter resistors connected at one end thereof together to form a junction point and at the other end thereof to the emitter electrodes of said transistors;
   means for connecting an intermediate tap of said first winding to said junction point of said first and second emitter resistors;
   an operating voltage source connected between an intermediate tap of second winding and said junction point of the emitter resistors;
   a third winding magnetically coupled with said first and second windings;
   a constant voltage element connected across said third winding for maintaining the voltage thereacross to a constant level; and
   an output winding magnetically coupled to said first, second and third windings whereby a rectangular wave voltage can be obtained in accordance with alternate on-off operations of said transistors whose amplitude is determined by the constant voltage element and turns ratio of the third and output windings.

2. A magnetic multivibrator circuit according to claim 1 in which a zener diode is used as the constant voltage element, one terminal of which is connected with both the ends of the third winding by way of rectifying diodes, respectively, and the other terminal of which is connected with an intermediate tap of said third winding.

3. A magnetic multivibrator circuit according to claim 1, which further comprises condensers connected between the ends of said second winding and the intermediate tap thereof, respectively, so as to prevent the circuit from undesired oscillation at high frequency.

4. A magnetic multivibrator circuit according to claim 1, which further comprises a rectifying diode inserted between the intermediate tap of said first winding and the junction point of the emitter resistors;
   a fourth winding magnetically coupled with said first, second, third and output windings connected to said rectifying diode for supplying the output voltage generated thereacross to the rectifying diode; and an impedance element connected between the intermediate taps of the first and second windings; whereby the base electrodes of the switching transistors are biased in a forward direction with respect to the emitter electrodes thereof.

5. A magnetic multivibrator circuit according to claim 4, which further comprises an additional rectifying diode connected in series with said fourth winding and a smoothing circuit connected between said rectifying diode and said additional rectifying diode.

6. A magnetic multivibrator circuit according to claim 5, which further comprises condensers connected between the ends of said second winding and the intermediate tap thereof, respectively, so as to prevent the circuit from undesired oscillation at high frequency.

7. A magnetic multivibrator circuit comprising:
   a pair of switching transistors each having base, emitter, and collector electrodes;
   a first winding connected between the base electrodes of said transistors;
   a second winding connected between the collector electrodes of said transistors and magnetically coupled with the first winding; first and second emitter resistors connected at one end thereof together to form a junction point and at the other ends thereof to the emitter electrodes of said transistors;
   means for connecting an intermediate tap of said first winding to said junction point of said first and second emitter resistors;
   an operation voltage source connected between an intermediate tap of said second winding and said junction point of the emitter resistors;
   constant voltage means for maintaining the voltage across one of the first and second windings at a constant value;
   an output winding magnetically coupled to said first and second windings whereby a rectangular wave voltage can be obtained in accordance with alternate on-off operations of said transistors.

8. A magnetic multivibrator circuit according to claim 7, which further comprises condensers connected between the ends of said second winding and the intermediate tap thereof, respectively, so as to prevent the circuit from undesired oscillation at high frequency.

9. A magnetic multivibrator circuit according to claim 7, which further comprises a rectifying diode inserted between the intermediate tap of said first winding and the junction point of the emitter resistors;
   a third winding magnetically coupled with said first and second windings and said output winding and connected to said rectifying diode for supplying the output voltage generated thereacross to the rectifying diode, and an impedance element connected between the intermediate taps of the first and second windings, whereby the base electrodes of the switching transistors are biased in a forward direction with respect to the emitter electrodes thereof.